United States Patent
Stallmann et al.

(10) Patent No.: US 10,821,400 B2
(45) Date of Patent: Nov. 3, 2020

(54) METHOD AND SYSTEM FOR $NO_x$ REMOVAL

(71) Applicant: General Electric Technology GmbH, Baden (CH)

(72) Inventors: Olaf Stallmann, Essenheim (DE); Wuyin Wang, Växjö (SE); Jean-Marc Gilbert Amann, Växjö (SE); Frank Klaus Ennenbach, Dreieich (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 14/813,630

(22) Filed: Jul. 30, 2015

(65) Prior Publication Data

US 2016/0045864 A1 Feb. 18, 2016

(30) Foreign Application Priority Data

Aug. 18, 2014 (EP) .................................. 14181291

(51) Int. Cl.
*B01D 53/75* (2006.01)
*B01D 53/56* (2006.01)
*B01D 53/78* (2006.01)
*B01D 53/86* (2006.01)

(52) U.S. Cl.
CPC ............ *B01D 53/78* (2013.01); *B01D 53/56* (2013.01); *B01D 53/75* (2013.01); *B01D 53/8625* (2013.01); *B01D 2251/106* (2013.01); *B01D 2251/2062* (2013.01); *B01D 2251/2067* (2013.01); *B01D 2251/60* (2013.01); *B01D 2257/404* (2013.01); *B01D 2258/0283* (2013.01)

(58) Field of Classification Search
None
See application file for complete search history.

(56) References Cited

U.S. PATENT DOCUMENTS

| 4,781,902 A * | 11/1988 | Schoubye | B01D 53/002 423/239.1 |
| 8,147,785 B2 * | 4/2012 | Pfeffer | B01D 53/56 423/234 |
| 2010/0290965 A1 | 11/2010 | Pfeffer et al. | |
| 2012/0009109 A1 * | 1/2012 | Wright | B01D 53/75 423/239.1 |

FOREIGN PATENT DOCUMENTS

| CA | 2 299 701 A1 | 2/1997 |
| DE | 102008062495 A1 | 6/2010 |
| DE | 102008062496 A1 | 6/2010 |
| EP | 2 481 471 A1 | 8/2012 |
| WO | 2006/025900 A2 | 3/2006 |

* cited by examiner

Primary Examiner — Anita Nassiri-Motlagh
(74) Attorney, Agent, or Firm — Grogan, Tuccillo & Vanderleeden, LLP

(57) ABSTRACT

A method for removing $NO_x$ from flue gas by SCR includes supplying a reagent for the SCR reaction of $NO_x$ into the flue gas, then contacting the flue gas with a catalyst. Supplying the reagent includes supplying a less than stoichiometric amount of reagent, and after contacting the flue gas with a catalyst a final $NO_x$ removal step is provided.

11 Claims, 1 Drawing Sheet

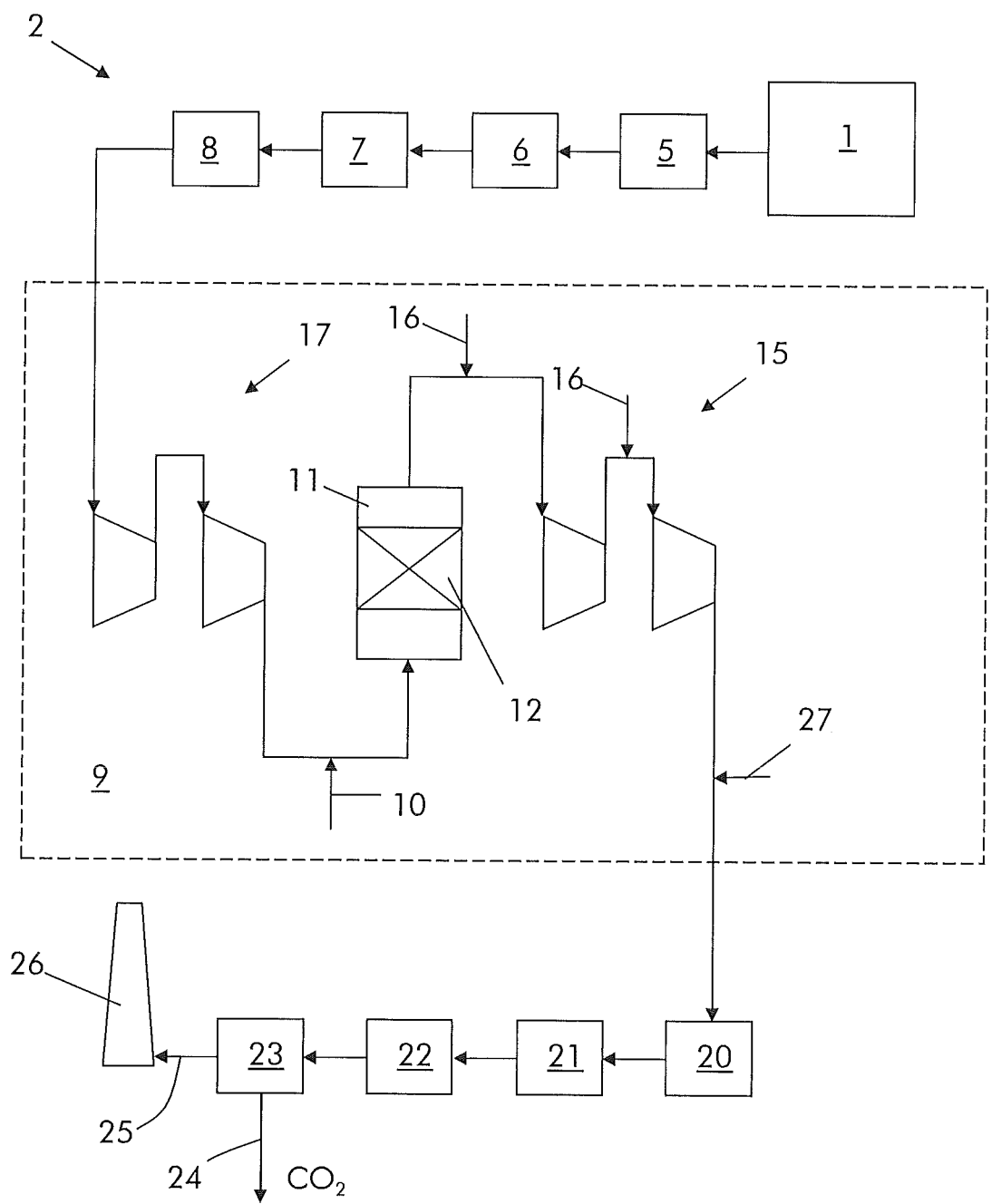

METHOD AND SYSTEM FOR NO$_x$ REMOVAL

CROSS-REFERENCE TO RELATED APPLICATIONS

This application claims priority to European Patent Application No. 14181291.7 filed Aug. 18, 2014, both of which are hereby incorporated in their entireties.

TECHNICAL FIELD

The present invention relates to a method and system for NO removal.

The method can be used to remove NO$_x$ from flue gas at elevated pressures generated by combustion of fossil fuel, for example in a power plant or in an industrial plant.

BACKGROUND

SCR is a well-known technology to remove NO$_x$ from flue gas. It includes supplying a reagent such as ammonia or urea in the flue gas being treated and then contacting the flue gas with a catalyst at a temperature between 250-400° C. The consequent reaction causes conversion of NO$_x$ into N$_2$ and water.

In order to get complete conversion of NO$_x$, the amount of reagent supplied into the flue gas is higher that the stoichiometric amount.

This causes a slip of reagent into the reaction product, i.e. reagent such as ammonia or urea is contained in the flue gas after the SCR reaction.

Reagent slip is undesirable because of the costs for the reagent and in addition the risk of salt precipitation. This is preferably happening at elevated pressures (>1.5 bar absolute) when the flue gas is rich in CO$_2$, H$_2$O and O$_2$. If for example ammonia is used as the reagent, residual ammonia contained in the flue gas after SCR reaction is precipitated as carbonate/bicarbonate when the flue gas becomes colder, with risks of plugging or corrosion.

Examples of the described traditional process are explained below.

DE 10 2008 062 495 discloses a flue gas treatment system with a SCR for complete NO$_x$ removal.

DE 10 2008 062 496 discloses a flue gas treatment system with a SCR and oxidant injection upstream of the compressor for NO conversion into NO$_2$ (embodiment A). DE 10 2008 062 496 also discloses a flue gas treatment system with a SCR downstream of a compressor, for NO conversion into NO$_2$ by pressure and oxygen contained in the flue gas.

SUMMARY

An aspect of the invention includes providing a method and system that prevent reagent slip, i.e. the flue gas after SCR reaction does not contain remaining reagent.

These and further aspects are attained by providing a method and a system in accordance with the accompanying claims.

BRIEF DESCRIPTION OF THE DRAWINGS

Further characteristics and advantages will be more apparent from the description of a preferred but non-exclusive embodiment of the method and system, illustrated by way of non-limiting example in the accompanying drawing, in which:

FIG. 1 shows an example of a system that implements the method of the invention.

DETAILED DESCRIPTION

In the following, the system for removing NO$_x$ from flue gas by SCR is described first.

A boiler 1 combusts a fuel such as coal with an oxidizer, such as air or oxygen or oxygen enriched air, and generates flue gas that is forwarded to a flue gas treatment system 2.

The flue gas treatment system 2 can include a dedusting unit 5 such as filters or electrostatic precipitators, a mercury removal unit 6, a sulphur removal unit 7 and a condenser 8 for water removal. The sequence in which these components are arranged is not relevant for the present invention and the presence of one or more of these components is also not relevant for the present invention.

Thus the sequence of the components could be different and one or more of these components could not be present without affecting the present invention. Downstream of these components the flue gas treatment system 2 has a system 9 for NO$_x$ removal.

The system 9 for NO$_x$ removal comprises a supply 10 for a reagent into the flue gas, and a reactor 11 including a catalyst 12 for SCR reaction downstream of the supply 10.

The reagent can be one or a mixture of the reagents commonly used for SCR, such as for example ammonia or urea. Other reagents can anyhow be used. The catalyst is likewise a catalyst commonly used for SCR, and can for example include vanadium, molybdenum, tungsten, zeolites, etc.

Downstream of the reactor 11, the system 9 for NO$_x$ removal includes means for final NO$_x$ removal.

In a first example the means for final NO$_x$ removal includes a compressor 15 like for example a multistage compressor able to compress the flue gas in a plurality of compression stages; in fact when considering the equilibrium $$NO + \tfrac{1}{2}O_2 \leftrightarrow NO_2 \qquad [1]$$

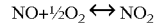

the high pressure pushes the equilibrium to the right, such that NO is converted into NO$_2$ that forms acidic solutions when liquid water is present. So NO$_x$ as such can easily be removed by cooling the gas below the dew point together with the forming water condensate. Alternately also a water injection could be done to achieve the same effect.

In a second example, the means for final NO$_x$ removal includes a supply 16 for oxidizer. The oxidizer can be hydrogen peroxide H$_2$O$_2$, other oxidizers are anyhow possible. The oxidizer causes oxidation of NO into NO$_2$ according to the reaction $$NO + H_2O_2 \rightarrow NO_2 + H_2O \qquad [2]$$

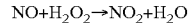

NO$_2$ is then removed with the water like in the first example.

Different embodiments of the system 9 for NO$_x$ removal can be provided with either the compressor 15 or the supply 16 for oxidizer or both the compressor 15 and the supply 16 for oxidizer. Adding of oxidizer in addition to increasing the pressure allows to speed up the reaction and reduce the residence time. When both the compressor 15 and the supply 16 for oxidizer are provided, the supply for oxidizer 16 can be located upstream of the compressor or between two compression stages. Naturally also more than one supply 16 can be provided, upstream and/or between two compression stages.

In addition, according to a preferred embodiment of the system 9 for NO$_x$ removal, a compressor 17 is also provided upstream of the reactor 11; the compressor 17 can be for example a multistage compressor able to compress the flue gas in a plurality of compression stages. This compressor 17 allows operation of the SCR at relatively high pressure. High pressure allows to minimize the SCR equipment size. Furthermore advantageously the flue gas at that location already has a low content of sulphur and particulate thus extending the lifetime of the catalyst.

Downstream of the reactor 11 and, when provided, either of the compressor 12, the peroxide injection 16 or both, the equilibrium of the reaction [1] above is pushed to the right such that NO conversion into $NO_2$ is enhanced and $NO_x$ removal is more efficient.

Downstream of the reactor the flue gas treatment system 2 may include further process steps like a mercury removal unit 20, a water separator 21 and conditionally also a dryer 22 and a $CO_2$ separator 23. From the $CO_2$ separator 23 a line 24 forwards $CO_2$ to further treatments or sequestration, and a line 25 forwards the flue gas deprived from $CO_2$ to the stack 26. Also in this case, the sequence of the components could be different and one or more of these components could not be present without affecting the present invention.

The operation of the flue gas treatment system 2 having the system for $NO_x$ removal 9 is apparent from what described and illustrated and is substantially the following.

The boiler 1 generates flue gas by combusting a fuel such as coal with an oxidizer. The flue gas is cleaned by passing it through the dedusting unit 5, mercury removal unit 6, sulphur removal unit 7 and its mass flow is reduced by passing it through the condenser 8.

The flue gas is then compressed at the compressor 17 to a pressure below 10 bar, for example between 5-8 bar.

Then a reagent is added to the flue gas via the supply 10. The reagent could be for example ammonia $NH_3$. Ammonia reacts with NO and $NO_2$ for example according to the reactions $$4NO+4NH_3 \rightarrow 4N_2+6H_2O \qquad [3]$$

$$2NO_2+4NH_3 \rightarrow 3N_2+6H_2O \qquad [4]$$

$$2NO+2NO_2+4NH_3 \rightarrow 4N_2+6H_2O. \qquad [5]$$

The conversion of NO and $NO_2$ into $N_2$ and water in the reactor 11 is not complete because of the less than stoichiometric amount of reagent added to the flue gas. The conversion is anyhow such that the final conversion is economically feasible. Downstream of the reactor 11, the oxidizer such as hydrogen peroxide $H_2O_2$ is added into the flue gas through the supply 16.

The oxidizer causes further conversion of NO into $NO_2$ according to the reaction $$NO+H_2O_2 \rightarrow NO_2+H_2O \qquad [6]$$

such that the flue gas downstream of the supply for oxidizer is practically free of NO, the whole NO having being converted into $NO_2$.

In addition, the flue gas is further compressed at the compressors 15 to a pressure of more than for example 10 bar. This pushes the equilibrium [1] to the right, increasing the amount of $NO_2$ in the flue gas and in parallel decreasing the amount of NO in the flue gas and thus enhancing the conversion of NO into $NO_2$.

$NO_2$ reacts with water (for example the water coming out of the reactions above or additional water supplied via a supply 27 for water) according to the reaction $$3\ NO_2+H2O \rightarrow 2\ HNO_3+NO \qquad [7]$$

that is soluble in water and can easily be removed with water.

The flue gas is thus further treated at the mercury removal unit 20, water separator 21 and dryer 22. At the water separator 21 water is removed and together with the water also the $HNO_3$ generated according to the reaction [7] is removed.

Thus flue gas free of water and other contaminants like $NO_x$ is forwarded from the water separator 21 via the dryer 22 to the $CO_2$ separator 23. At the $CO_2$ separator 23 $CO_2$ is separated and collected via the line 24, while the flue gas deprived of $CO_2$ and contaminants is sent to the atmosphere via the stack 26.

The present invention also refers to a method for removing $NO_x$ from flue gas by SCR.

The method comprises supplying a reagent for the SCR reaction of $NO_x$ into the flue gas, and then contacting the flue gas with a catalyst.

Advantageously, supplying the reagent includes supplying a less than stoichiometric amount of reagent, and after contacting the flue gas with a catalyst a final $NO_x$ removal step is provided.

The less than stoichiometric amount of reagent is arranged to remove at least 80%, more preferably between 80-95% and more preferably between 85-90% of $NO_x$ by volume from the flue gas.

In addition, preferably the flue gas is compressed before contacting the flue gas with the catalyst.

The stoichiometric and/or less than stoichiometric amount of reagent can be determined on the basis of measured or calculated $NO_x$ content of the flue gas.

The final $NO_x$ removal step comprises compressing the flue gas in at least one compression stage and/or supplying an oxidizer into the flue gas after contacting the flue gas with a catalyst. When both compression and supply of oxidizer are provided as the final $NO_x$ removal step, the supply of oxidizer can be carried out upstream and/or between the compression stages. In addition, the flue gas is preferably cooled between each compression stage.

Naturally the features described may be independently provided from one another.

In practice the materials used and the dimensions can be chosen at will according to requirements and to the state of the art.

The invention claimed is:

1. A method for removing NOx from flue gas by SCR, the method comprising:
   at least a first NOx removal step, the first NOx removal step comprising
   compressing the flue gas to a first selected pressure;
   supplying a reagent for SCR reaction of NOx into the compressed flue gas,
   contacting the compressed flue gas and reagent with a catalyst to form a treated flue gas, and
   wherein supplying the reagent includes supplying a less than stoichiometric amount of reagent,
   and providing the treated flue gas to a final NOx removal step and
   wherein the final NOx removal step comprises:
   supplying an oxidizer into the treated flue gas to convert NO to $NO_2$ in presence of the oxidizer, forming an oxidized flue gas;
   contacting the oxidized flue gas with water for removal of $NO_2$ with water.

2. The method of claim 1, wherein the less than stoichiometric amount of reagent is arranged to remove at least 80% of NOx by volume from the flue gas.

3. The method of claim 1, wherein the final NOx removal step includes compressing the flue gas in a plurality of compression stages.

4. The method of claim 1, further comprising supplying the oxidizer before compressing the flue gas.

5. The method of claim 1, further comprising the steps of:
compressing the flue gas in a first multi-stage compression process upstream from the SCR reaction;
compressing the flue gas in a second multi-stage compression process downstream from the SCR reaction;
wherein the oxidizer is supplied between two compression stages of the second multi-stage compression process.

6. The method of claim 5, further comprising cooling the flue gas after compressing the flue gas or after each compression stage.

7. The method of claim 1, further comprising determining the less than stoichiometric amount of reagent on the basis of measured NOx content of the flue gas.

8. A method for removing NOx from a flue gas, the method comprising:
removing NOx in a first stage, the first stage comprising:
compressing the flue gas in a first multi-stage compression process;
supplying a less than stoichiometric amount of reagent into the compressed flue gas;
contacting the compressed flue gas and reagent with a catalyst in an SCR reactor to convert NO to $NO_2$, and form a treated flue gas
removing NOx in a second stage, the second stage comprising:
compressing the treated flue gas in a second multi-stage compression process, to form a compressed treated flue gas;
supplying an oxidizer into the compressed treated flue gas between compression stages of the second multi-stage compression process to convert NO to $NO_2$, wherein the second NOx removal stage comprises the removal of $NO_2$ with water; and
cooling the compressed treated flue gas.

9. The method of claim 2, wherein the less than stoichiometric amount of reagent is arranged to remove more preferably between 80-95% of NOx by volume from the flue gas.

10. The method of claim 2, wherein the less than stoichiometric amount of reagent is arranged to remove more preferably between 85-90% of NOx by volume from the flue gas.

11. The method of claim 2, wherein the less than stoichiometric amount of reagent is arranged to remove more than 85% of NOx by volume from the flue gas.

* * * * *